E. H. VINCENT.
SHIFTABLE STEERING WHEEL.
APPLICATION FILED MAR. 16, 1917.
1,272,582.
Patented July 16, 1918.
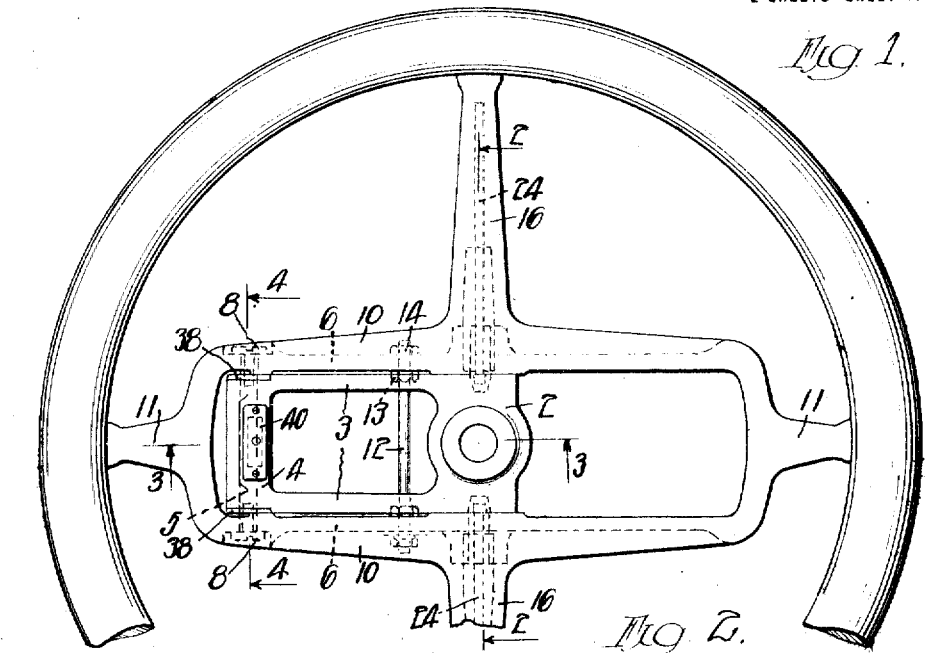
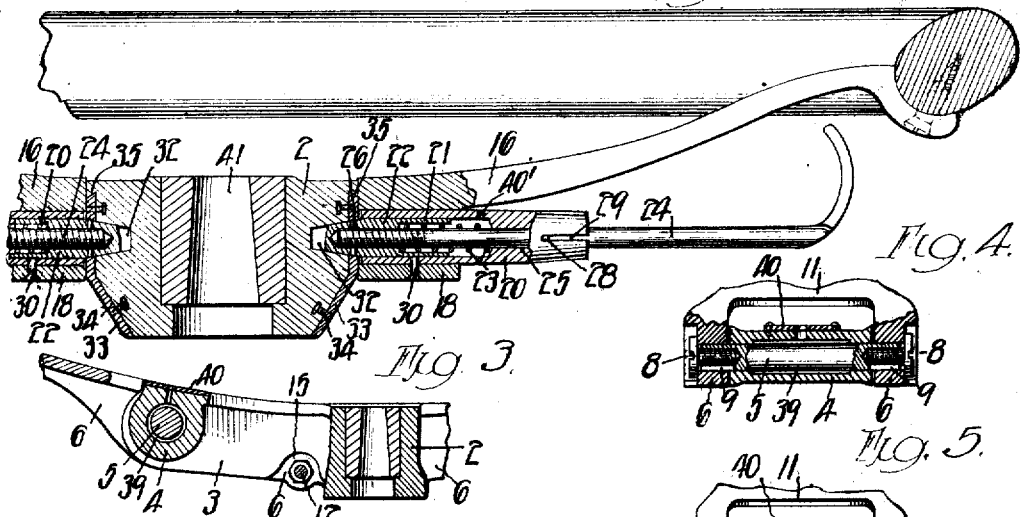
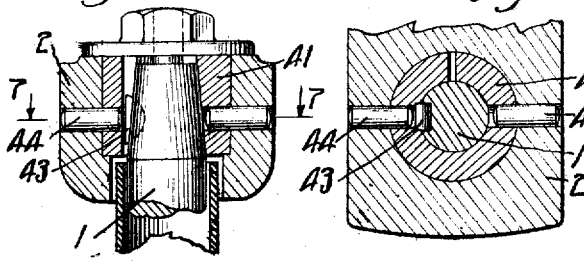
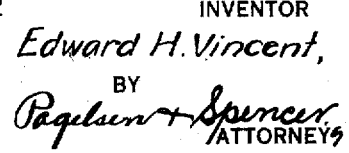
INVENTOR
Edward H. Vincent,
BY
Pagelsen + Spencer
ATTORNEYS E. H. VINCENT.
SHIFTABLE STEERING WHEEL.
APPLICATION FILED MAR. 16, 1917.
1,272,582.
Patented July 16, 1918.
2 SHEETS—SHEET 2.
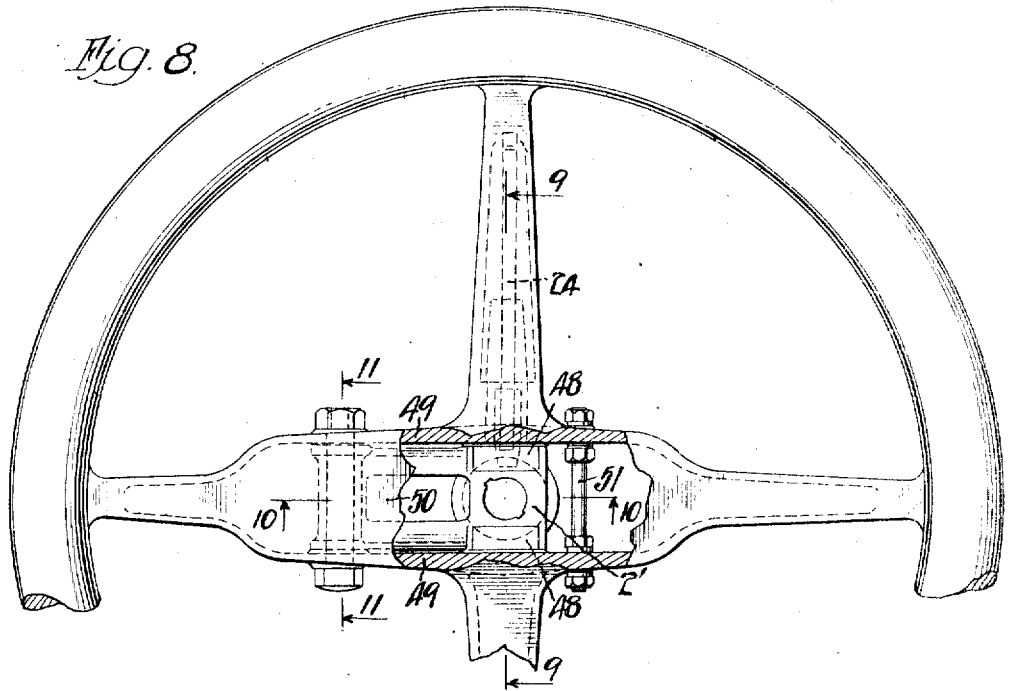
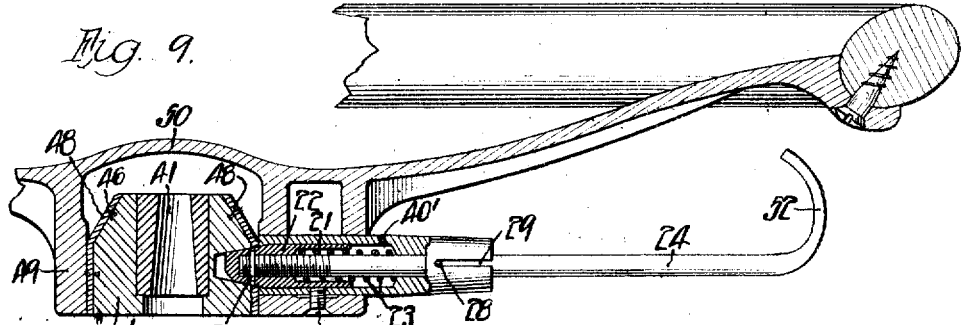
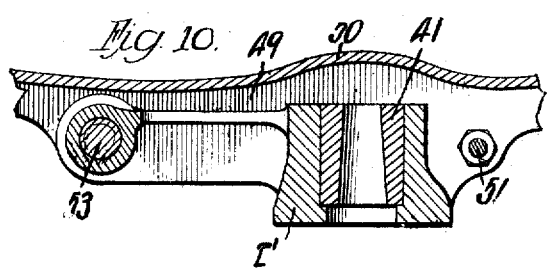
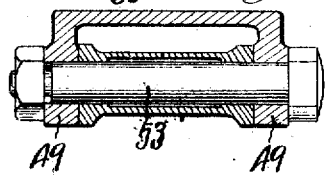
INVENTOR
Edward H. Vincent,
BY
Pagelsen & Spencer,
ATTORNEYS

UNITED STATES PATENT OFFICE.

EDWARD H. VINCENT, OF DETROIT, MICHIGAN.

SHIFTABLE STEERING-WHEEL.

1,272,582.  Specification of Letters Patent.  Patented July 16, 1918.

Application filed March 16, 1917. Serial No. 155,154.

*To all whom it may concern:*

Be it known that I, EDWARD H. VINCENT, a citizen of the United States, and residing at Detroit, in the county of Wayne and State of Michigan, have invented a new and Improved Shiftable Steering-Wheel, of which the following is a specification.

The present invention relates to shiftable steering wheels for motor vehicles, more particularly to the class of wheels in which the clearance for the driver is obtained by a swinging movement of the spider and rim in respect to the steering post. Among the novel features of the invention are interchangeable bushings for the wheel whereby the latter may be applied to steering shafts, the upper ends of which are of different shapes or sizes; a pivot construction having a horizontal axis offset from the axis of the steering post together with means offset from said pivot construction whereby the spider may be adjusted to or from the side faces of the head of the post; certain improvements in the pivot construction; certain improvements in the latch mechanism whereby a plurality of spaced bearings are formed for the sliding parts; and inserts in the head for receiving the impact of the latch. The invention also consists in the details of construction shown, described and claimed.

In the drawings, Figure 1 is a fragmentary plan view showing one embodiment of my invention. Figs. 2, 3 and 4 are sections on the lines 2—2, 3—3 and 4—4, respectively, of Fig. 1. Fig. 5 is a section corresponding to Fig. 4 showing a modification. Fig. 6 is a vertical section showing a construction by which the wheel, by simply changing bushings, may be applied to different shapes and sizes of steering shafts. Fig. 7 is a section on the line 7—7 of Fig. 6. Fig. 8 is a fragmentary plan view, parts being broken away, showing a modification. Figs. 9, 10 and 11 are sections on the lines 9—9, 10—10 and 11—11, respectively, of Fig. 8.

The steering shaft 1 (which appears only in Figs. 6 and 7) may be of any suitable form and has rigidly mounted thereon a head 2 that includes the forwardly extending webs 3 and the cross bar 4 by which the front ends of the webs are joined. The cross bar (Fig. 4) is hollow and receives the pivot 5, the ends of which extend into the webs 6 that are a part of the spider. Included in the pivot are the cap screws 8 whereby the webs may be drawn more or less tightly into engagement with the corresponding faces of the head. Pressure of the cap screws on the webs 6 is ordinarily sufficient to cause the pivot to turn with the spider, but the ends of the pivot may be split at 9 to allow the cap screws to expand said split portions in the bore in the spider to insure this action if desired.

The webs merge at their top edges into horizontal flanges 10, and both webs and flanges are continued for some distance to the rear of the head; they are also brought together front and rear and extended to the rim through the medium of the undivided ends 11. In other words, the ends 11 together with the webs and flanges constitute two alined divided spokes or arms of the spider and together inclose a substantially rectangular space in which the head is received and in which clearance is provided for the steering post when the wheel is tilted. The webs 6 are connected at a point rearwardly from the pivot by means of a cross bolt 12 and inner and outer nuts 13 and 14, and the webs 3 are cut away as indicated at 15 (to allow full swinging action), whereby bearing areas are provided opposite the axis of the steering post and whereby the webs 6 may be readily adjusted toward or from the head at these points to insure a proper engagement. Other arms 16 of any desired cross section extend at right angles to the middle of the double spoke 6—10—11 and merge with the webs 6 in perforated bosses 18 (Fig. 2).

20—20 indicate hollow plugs that are inserted in the perforations in the bosses and have their inner ends bored out to form guides for the barrels 21 of internally threaded latch heads 22. The inner ends of the latter are also preferably bored out to receive the springs 23 whose other ends are seated in the bottom of the bores in the plugs. Latch rods 24, slidable through bearings 25 in the outer ends of the plugs, are threaded into the corresponding head 22 until a proper relative adjustment is secured, and may be retained therein by cross pins 26 that are driven into holes drilled transversely through the latch heads and rods after the latter are adjusted in the heads. Rotation of the rods relative to the plug is prevented by cross pins 28 received in slots 29 in the plugs, but the same result might obviously be secured by making the rod and bearing of non-circular cross-section. The pins and slots have other functions in that they limit the movement of the latches toward the head when the wheel is in non-steering position; also in that the arrangement of the pins in a plane parallel to the plane of the wheel stiffens the rods and renders unnecessary close correspondence between the external diameter of the rod and the internal diameter of the bearing in the plug. In order to prevent the plugs from working loose, pins 30 are pressed into holes drilled transversely through the bosses and into the plugs. The ends of the latch heads are preferably frusto-conical, and their end faces are inclined downwardly and inwardly. From the above it will be seen that the latch is supported in two spaced bearings (one for the head and one for the rod) and is therefore very rigidly maintained in proper alinement.

The head is, of course, provided with sockets 32 corresponding to the latch heads, and the lower side portions of the head taper downwardly opposite the steering post as indicated in Fig. 2. As the head and spider are ordinarily made of cast aluminum, said side portions are grooved to receive the hard (preferably brass) facings 33 that are placed in the molds before the metal is poured. Anchor pins 34 may extend inwardly from the facing, and one or more of the edges of the facings may be tapered to extend into the metal of the head, as indicated at 35, to secure a proper bond.

It being understood that the right side of the spider and rim is swung downwardly from the plane of the paper to obtain clearance (Fig. 1), it will be seen that, as the wheel is swung back to steering position, the latch heads contact with the hardened inclined surfaces of the inserts and are forced outwardly against the spring 23, and finally snap into the corresponding sockets. The wear, both when the wheel is in steering position and when it is being swung to or from such position, comes on the hardened inserts.

It is desirable also to mill out the faces of the webs 3 around the axis of the pivot and to interpose hard washers 38 between said faces and the webs 6.

For the purpose of insuring lubrication of the pivot (which turns in the head) the crosspiece 4 is cored out to form a chamber 39 to which oil may be squirted through a hole in the name plate 40. Oil may also be supplied through holes 40' to the interior of the plugs 20.

In order to render the wheel as nearly as possible of general application, the head may be bored out (Figs. 6 and 7) to receive an interchangeable bushing 41 (that may be split as shown) the inner surface of which tapers or otherwise conforms to the end of the particular steering shaft 1 to which the wheel is to be applied. A key 43 prevents relative rotation of the bushing and shaft, and one or more pins 44 have a like office in respect to the bushing and the spider. Obviously the pins 44 may be replaced by a threaded connection between the bushing and the head.

The embodiment shown in Figs. 8 to 11, inclusive, differs from that just described mainly in that the right side of the rim and spider (Fig. 8) is swung upwardly instead of downwardly to secure clearance. (This construction is ordinarily applicable only to wheels which are not surmounted by engine control mechanism, whereas that previously described may be applied to either type). Consequently the upper side portions, instead of the lower, are tapered inwardly as shown at 46. Inserts 48 correspond to the inserts 32, but are, of course, reversely arranged. This allows the use of a head 2', smaller than the head 2.

In this instance the webs 49, which replace the webs 6, are preferably joined by a portion 50 which conceals the head and stiffens the spider. The cross bolt 51 is located on the side of the axis of the steering post opposite the pivot. The latch mechanism is the same as previously employed except in a slight difference that the latch head is rotated 180° in respect to the rod to incline the outer face of the latch to correspond to the difference in the incline of the face of the head. The latch mechanism on one side of the head is also omitted. In both cases, the upturned end 52 of the latch rod lies just below and slightly inwardly from the rim, and affords a very convenient grip for the hand.

A modified form of pivot consisting of a bolt 53 having a reduced threaded end the base of which is inset slightly from the web when the parts are positioned is shown in both Figs. 5 and 11.

The details of construction may obviously be changed within considerable limits without departing from the spirit of the invention; I do not, therefore, wish to be limited except as indicated by the subjoined claims.

I claim:

1. In combination, a shaft, a head fixed to the end thereof and having a socket, a spider tiltable on the head, said spider including a boss having a perforation in substantial alinement with said socket when the spider is in steering position, a hollow plug for the socket, the opening in the plug being of greater cross section in its inner portion than in its outer portion, a latch head slidable in the inner portion of the plug toward and from the socket, a latch rod secured to the latch head and extending out through the outer end of the plug, and a compression spring pocketed in the plug whereby the latch head is normally held in the socket.

2. In combination, a steering shaft for a motor vehicle, a head secured thereon, said head having side faces, a spider, pivot means for connecting the spider to the head, said pivot means including means whereby the degree of pressure exerted by the spider upon the head adjacent the axis of the pivot means may be determined, and means spaced from the pivot means for independently determining the degree of pressure exerted between the spider and said side faces at a point a considerable distance from the axis of the pivot means.

3. In combination, a steering shaft for a motor vehicle, a head secured thereon, said head having side faces, a spider, pivot means for connecting the spider to the head, said pivot means including means whereby the degree of pressure exerted by the spider upon the head adjacent the axis of the pivot means may be determined, and a cross bolt parallel to the axis of the pivot means for independently determining the degree of pressure exerted between the spider and said side faces at a point a considerable distance from the axis of the pivot means.

4. In combination, a steering shaft for a motor vehicle, a head secured thereon, said head having side faces, a spider, pivot means for connecting the spider to the head and a cross bolt spaced from the pivot means for determining the degree of pressure exerted between the spider and said side faces at a point a considerable distance from the axis of the pivot means.

5. In combination, a steering shaft for a motor vehicle, a head secured thereon, said head having side faces, a spider, a pivot rotatable in said head for connecting the spider to the head, the axis of said pivot being removed from and at right angles to the axis of said steering shaft, said pivot including means whereby the pressure between the spider and the head may be varied, and hardened washers interposed between the head and the spider.

6. In combination, a steering shaft for a motor vehicle, a head secured thereon, a spider, a pivot extending through the head for connecting the spider thereto, said pivot being rotatable in the head, said head having an annular chamber surrounding an intermediate portion of the pivot for supplying lubricant thereto.

7. In combination, a steering shaft for a motor vehicle, a head thereon, a spider tiltable on the head, a latch carried by the spider, said head being formed of relatively soft material and having a socket therein for receiving said latch, said head including a hard perforated face plate surrounding the entrance to said socket and having a surface inclined to the latch and arranged to be struck by the latter as the spider swings to steering position.

8. In combination, a steering shaft for a motor vehicle, a head fixed to the upper end thereof, said head having a socket therein, a spider tiltable on said head, said spider including a boss having a perforation in substantial alinement with said socket when the spider is in steering position, a plug for the socket, said plug being hollow, a latch slidable in said plug to and from the socket in the head, said latch including a latch rod and a latch head of greater cross-sectional area than the rod, said head being supported in spaced guides formed in the plug.

EDWARD H. VINCENT.